Patented Apr. 16, 1935

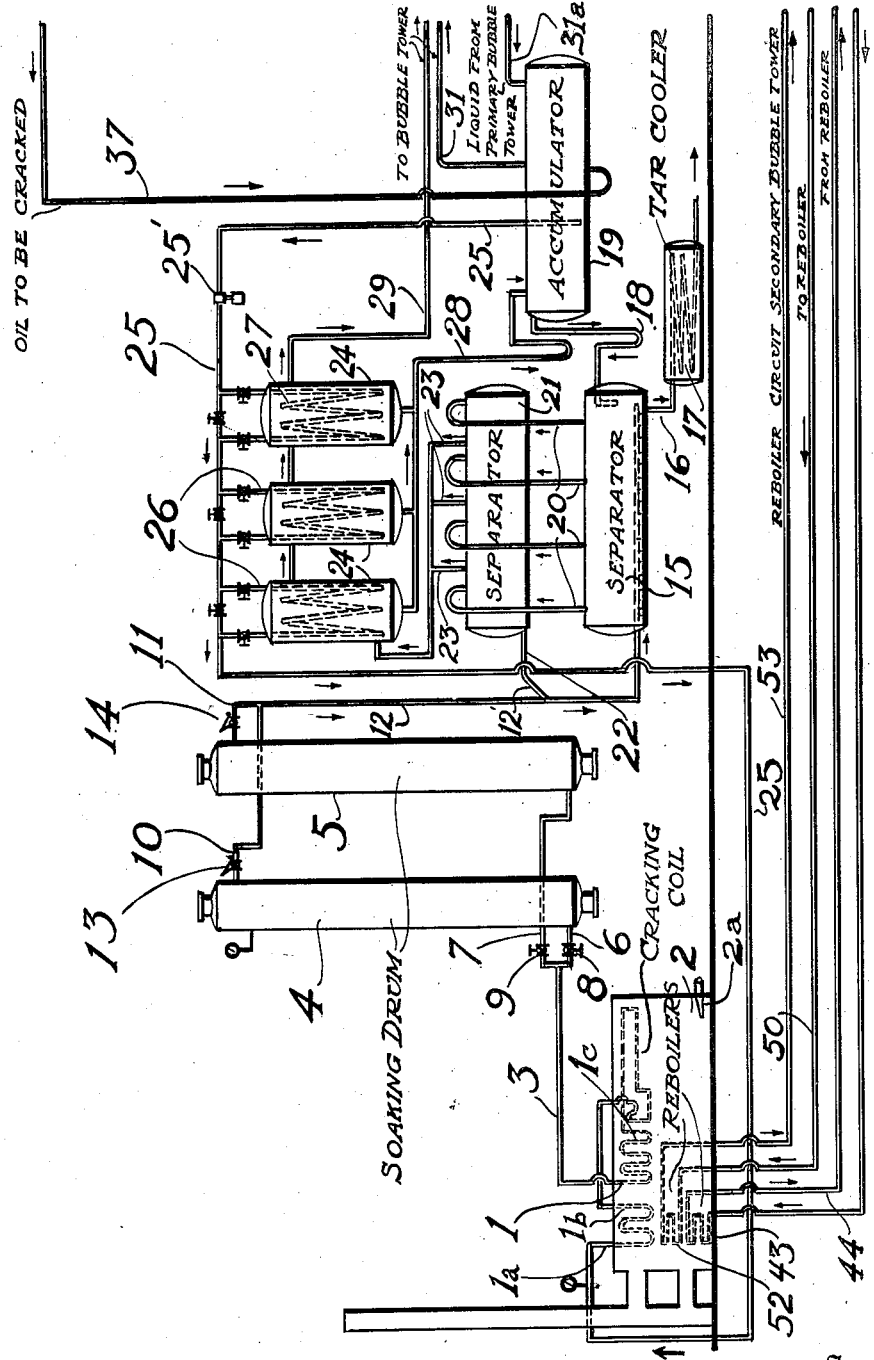

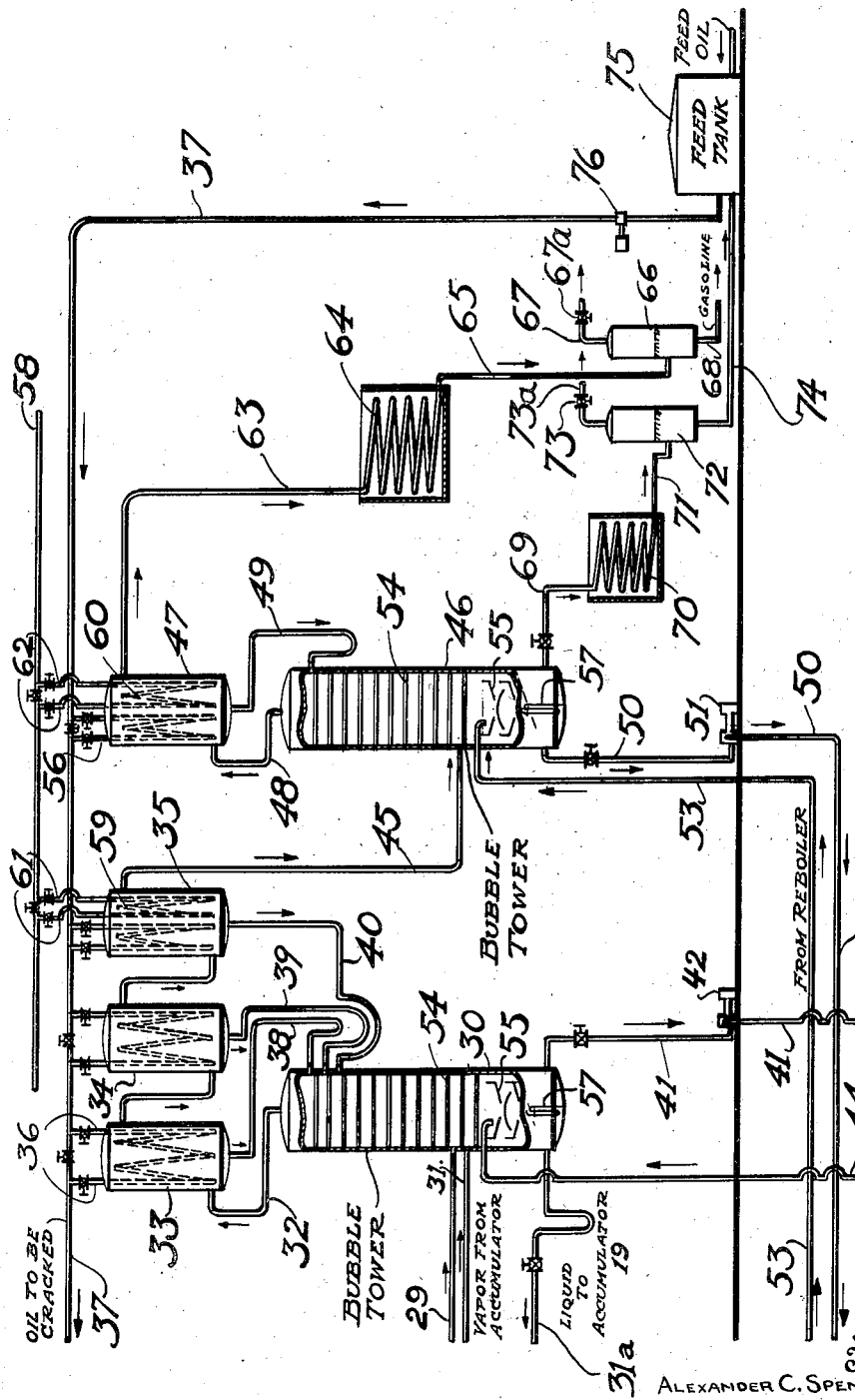

1,998,402

UNITED STATES PATENT OFFICE 1,998,402

APPARATUS FOR CRACKING OIL

Alexander C. Spencer, Ontario Province, Canada, and Eric W. Luster, Westfield, N. J., assignors to Standard Oil Development Company, New York, N. Y., a corporation of Delaware Application August 11, 1927, Serial No. 212,266

1 Claim. (Cl. 196—104)

This invention relates to improvements in methods and apparatus for cracking hydrocarbon oils and will be fully understood from the following description, read in connection with the accompanying drawings, in which Fig. I is a diagrammatic side elevation of equipment embodying the invention; and Fig. II is a similar view of a continuation of the equipment of Fig. I, and showing other features of the invention.

Referring to the drawings, reference numeral 1 denotes an elongated passageway or cracking coil installed in a furnace setting 2 provided with burners 2a. Oil enters the coil at 1a, preferably flowing first in section 1b countercurrent with the combustion gases from the furnace, and then concurrent with these gases in section 1c.

The oil passes from the coil through a pipe 3 into one or the other of the large thermally-insulated reaction chambers or soaking drums 4 and 5. Branch pipes 6 and 7, having valves 8 and 9, connect the pipe 3 with the drums 4 and 5, respectively. One drum will be in use while the other is being cleaned. Outlet pipes 10 and 11 convey the cracked product from the upper part of the drums to a discharge line 12. Pressure control valves 13 and 14 are installed in the outlet pipes. The cracked oil enters a separator 15, preferably of the horizontal cylindrical type, from which the heavy tar is taken off through a line 16 from the bottom of the separator to a cooler 17. An over-flow pipe 18 connects an accumulator 19 with the separator 15. Vapors from the separator 15 pass through pipes 20 to a second separator 21, in which some condensate is formed, and entrained particles are removed from the vapors. Liquid oil flows from separator 21 through a pipe 22 to the pipe 12 leading to the separator 15. Pipe 12 preferably has a perforated discharge portion extending along the bottom of separator 15 and the junction of pipes 22 and 12 is preferably made with an eductor 12'.

Pipes 23 carry vapors from the separator 15 to heat exchange equipment, which may comprise three series-connected units 24, each receiving a cooling medium, such as the oil fed to the cracking coil, from a pipe 25, in which a pump 25' is installed. Valve controlled by-pass lines 26 lead from pipe 25, or other source of cooling fluid, to coils 27 in the heat exchangers 24. Condensate formed in the exchangers passes through pipe 28 to accumulator 19. Uncondensed vapors flow through a pipe 29 to an intermediate portion of a fractionating column or bubble tower 30, Fig. 2. A vapor line 31 from the accumulator 19 also discharges into tower 30, adjacent the outlet of pipe 29.

Fractionated vapors from tower 30 are conveyed by a pipe 32 to the first of a series of heat exchangers 33, 34, and 35. These exchangers are provided with valve controlled by-pass lines 36 connected to a feed oil line 37 which discharges into accumulator 19. Condensates formed in the several exchangers 33, 34, and 35, are separately returned to tower 30 through pipes 38, 39, and 40. Condensate may be taken off from the bottom of tower 30 through a pipe 41, in which a pump 42 is installed, to a heating coil 43 arranged in cracking coil setting 2. The heated condensate is returned through a pipe 44 to the intermediate portion of tower 30. Condensate may also be run into the accumulator 19 through pipe 31a. All the pipe lines conveying hot oil are suitably insulated.

The vapors leaving condenser 35 pass through a pipe 45 to the middle portion of a second fractionating tower 46, which is equipped at the top with a heat exchanger 47. Vapors pass from tower 46 through a pipe 48 into heat exchanger 47, and condensate formed therein is returned through a pipe 49 to the upper part of tower 46. Condensate from the tower is taken off through a pipe 50 in which a pump 51 is installed, to a heating coil 52 in cracking coil setting 2. The heated condensate goes through a pipe 53 to an intermediate part of tower 46.

Towers 30 and 46 are preferably provided with bell cap plates 54 and baffle plates 55, arranged as shown. Heat exchanger 47 is supplied with cooling fluid through by-pass lines 56 connected to pipe 37, or other source of cooling fluid. Baffles 57 are set vertically in the bottoms of the towers, so as to divide them into two chambers.

To permit accurate control of temperature in the heat exchangers 35 and 47, it is desirable to provide auxiliary cooling means for the last stages of condensation in such exchangers. This control may be effected by use of a special body of heat exchange liquid circulated through a closed system including a pipe 58, communicating with coils 59 and 60 in heat exchangers 35 and 47, respectively, through valved by-pass lines 61 and 62. Vapors from exchanger 47 pass through a pipe 63 to a cooling coil 64 and thence through a pipe 65 to a gasoline receiving drum 66, which has the usual gas vent 67 and draw-off line 68. A pressure control valve 67a is installed in pipe 67.

Condensate from tower 46 is withdrawn through a pipe 69 to a cooler 70 and thence through a pipe 71 into a receiving drum 72. This has a gas vent 73 and a draw-off line 74 leading to a tank 75 containing the oil to be cracked. The pipe 73 has a pressure control valve 73a.

A pump 76 forces the oil from tank 75 through pipe 37 and into accumulator 19. The fresh feed oil, mixed with condensate, is withdrawn from the accumulator through pipe 25 and is forwarded by pump 25' to the cracking coil 1, on its way passing through exchangers 24, as previously described.

While the equipment is designed to be used with a variety of stocks to be cracked, for illustration a run with a mixture of equal parts of fresh oil and condensate from the bubble towers will be described.

The accumulator 19 is charged with fresh oil from tank 75 and pipe 37 before starting the operation. Oil is then pumped through line 25 from the accumulator into the cracking coil 1, which is fired to impart a temperature of about 875° F. to the oil at the exit of the coil. The hot, partially cracked oil passes from the coil into drum 4, in which the oil remains for a considerable time, the temperature in the drum being about 825° F. The pressure in the coil is held at about 900 lbs. per square inch and in the drum at about 750 lbs. Pressure is released at the valve 113 to about 60 lbs. per square inch, at which pressure the remainder of the system is operated. This pressure is held by regulation of the valves 61a and 73a on the outlet lines 67 and 73. By means of the preheating arrangement shown, (exchangers 24, 33, 34, 35, and 47), the fresh oil acquires a temperature of about 600° F. before it enters the coil 1.

An important advantage of the invention is the utilization of heat in the cracking coil setting to raise the temperature of condensate formed in the fractionating towers 30 and 46. In this way low boiling fractions, which would otherwise be retained by these condensates, are driven off and recovered. It is practical to omit the second tower 46 if sharp fractionating is not required. We prefer, however, to use this tower since it enables us to obtain end point gasoline in a single operation. Using the complete equipment shown, the process can be operated to produce only gasoline, coke, and gas. The yields of gasoline are good.

Various changes and alternative procedures may be adopted within the scope of the appended claim, in which it is our intention to claim all novelty inherent in the invention as broadly as the prior art permits.

We claim:

In tube and drum apparatus for the cracking of oil, the improvement which comprises a separator connected to receive the hot cracked product from the drum, pipes for separately withdrawing vapors and tar from the separator, heat exchange means for condensing heavier vapors by indirect cooling, an accumulator, means for conveying the condensed heavier vapors to the accumulator, a fractionating tower, a pipe for conveying vapors from the heat exchange means to the fractionating tower, a pipe for conveying condensate from the fractionating tower to the accumulator, means for condensing a vaporous product of the fractionation, a pipe for supplying fresh oil to be cracked to the accumulator, and a pipe for conveying the mixed oils from the accumulator to the tube and drum cracking equipment.

ALEXANDER C. SPENCER.
ERIC W. LUSTER.